United States Patent
Chang et al.

(10) Patent No.: US 12,335,506 B2
(45) Date of Patent: Jun. 17, 2025

(54) ELECTRONIC DEVICE AND ASSOCIATED SIGNAL PROCESSING METHOD

(71) Applicant: Realtek Semiconductor Corp., HsinChu (TW)

(72) Inventors: Wun-Lin Chang, HsinChu (TW); Pui-Kei Leong, HsinChu (TW); Ching-Sheng Cheng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 15 days.

(21) Appl. No.: 18/237,380

(22) Filed: Aug. 23, 2023

(65) Prior Publication Data
US 2024/0205443 A1    Jun. 20, 2024

(30) Foreign Application Priority Data
Dec. 14, 2022   (TW) .................................. 111148038

(51) Int. Cl.
*H04N 19/46*      (2014.01)
*H04N 21/4363*   (2011.01)

(52) U.S. Cl.
CPC ....... *H04N 19/46* (2014.11); *H04N 21/43635* (2013.01)

(58) Field of Classification Search
CPC .... G06F 3/0412; G06F 3/04184; G06F 3/044; G06F 3/0416; G06F 3/0484; G09G 2310/08; G09G 2320/064; G09G 2354/00; G09G 3/3406
USPC .............................................. 375/240
See application file for complete search history.

(56) References Cited

U.S. PATENT DOCUMENTS

2016/0353073 A1* 12/2016 Nakajima ............ H04N 21/426
2019/0230196 A1* 7/2019 Huang .................... H04L 69/18

FOREIGN PATENT DOCUMENTS

| CN | 113114967 A | 7/2021 |
| EP | 3 968 318 A1 | 3/2022 |
| JP | 2012514351 A * | 6/2012 |

* cited by examiner

*Primary Examiner* — Masum Billah
(74) *Attorney, Agent, or Firm* — Winston Hsu

(57) ABSTRACT

An electronic device includes a decoder circuit, an image processing circuit, a detection circuit, a transmission interval determination circuit, an auxiliary data extraction circuit, and an encoder circuit. The decoder circuit decodes an input signal to generate the decoded signal. The image processing circuit performs image processing on the decoded signal to generate processed image data. The detection circuit detects timing of an active display area and a vertical synchronization signal in the processed image data to generate a detection result. The transmission interval determination circuit determines a transmission interval of the processed image data according to the detection result. The auxiliary data extraction circuit extracts auxiliary data from the decoded signal. The encoder circuit places the auxiliary data in the transmission interval of the processed image data, and performs encoding to generate an output signal.

16 Claims, 4 Drawing Sheets

ELECTRONIC DEVICE AND ASSOCIATED SIGNAL PROCESSING METHOD

BACKGROUND OF THE INVENTION

1. Field of the Invention

The present invention is related to a signal processing method for a High Definition Multimedia Interface (HDMI), and more particularly, to an electronic device capable of transmitting auxiliary data by detecting an active display area and a vertical synchronization signal of frames.

2. Description of the Prior Art

In an HDMI specification (e.g. version 2.1), a frame accurate packet area (FAPA) for transmitting an extended metadata packet is defined, wherein a range of the FAPA is half of an area from a horizontal blanking interval to a vertical blanking interval (VBI) of the first row of an active display area of a frame. Take two frames, F1 and F2, shown in FIG. 1 and defined by a vertical synchronization signal Vsync and a horizontal synchronization signal Hsync as examples. An area between an active display area of the frame F1 and that of the frame F2 is the VBI, and the bottom of the FAPA is half the number of rows of the VBI.

If, however, the image source supports a variable frame rate or a variable refresh rate, the number of rows of the VBI will vary with different frames, and therefore the range of the FAPA will also vary. An electronic device therefore needs to continuously set an interval for transmitting the extended metadata packet through software to generate an HDMI signal conforming to the specification, which will cause a computing burden on the electronic device.

SUMMARY OF THE INVENTION

It is therefore one of the objectives of the present invention to provide an electronic device, which can determine a range of a FAPA for transmitting auxiliary data by detecting an active display area and a vertical synchronization signal of frames, to address the above-mentioned issues.

According to an embodiment of the present invention, an electronic device is provided. The electronic device comprises a decoder circuit, an image processing circuit, a detection circuit, a transmission interval determination circuit, an auxiliary data extraction circuit, and an encoder circuit. The decoder circuit is arranged to decode an input signal to generate a decoded signal. The image processing circuit is arranged to perform image processing upon the decoded signal to generate a processed image data. The detection circuit is arranged to detect a timing of an active display area and a vertical synchronization signal in the processed image data, to generate a detection result. The transmission interval determination circuit is coupled to the detection circuit, and is arranged to determine a transmission interval of the processed image data according to the detection result. The auxiliary data extraction circuit is arranged to extract an auxiliary data from the decoded signal. The encoder circuit is arranged to place the auxiliary data in the transmission interval of the processed image data, and perform encoding to generate an output signal.

According to an embodiment of the present invention, a signal processing method is provided. The signal processing method comprises: decoding an input signal to generate a decoded signal; performing image processing upon the decoded signal to generate a processed image data; detecting a timing of an active display area and a vertical synchronization signal in the processed image data, to generate a detection result; determining a transmission interval of the processed image data according to the detection result; extracting an auxiliary data from the decoded signal; and placing the auxiliary data in the transmission interval of the processed image data, and performing encoding to generate an output signal.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
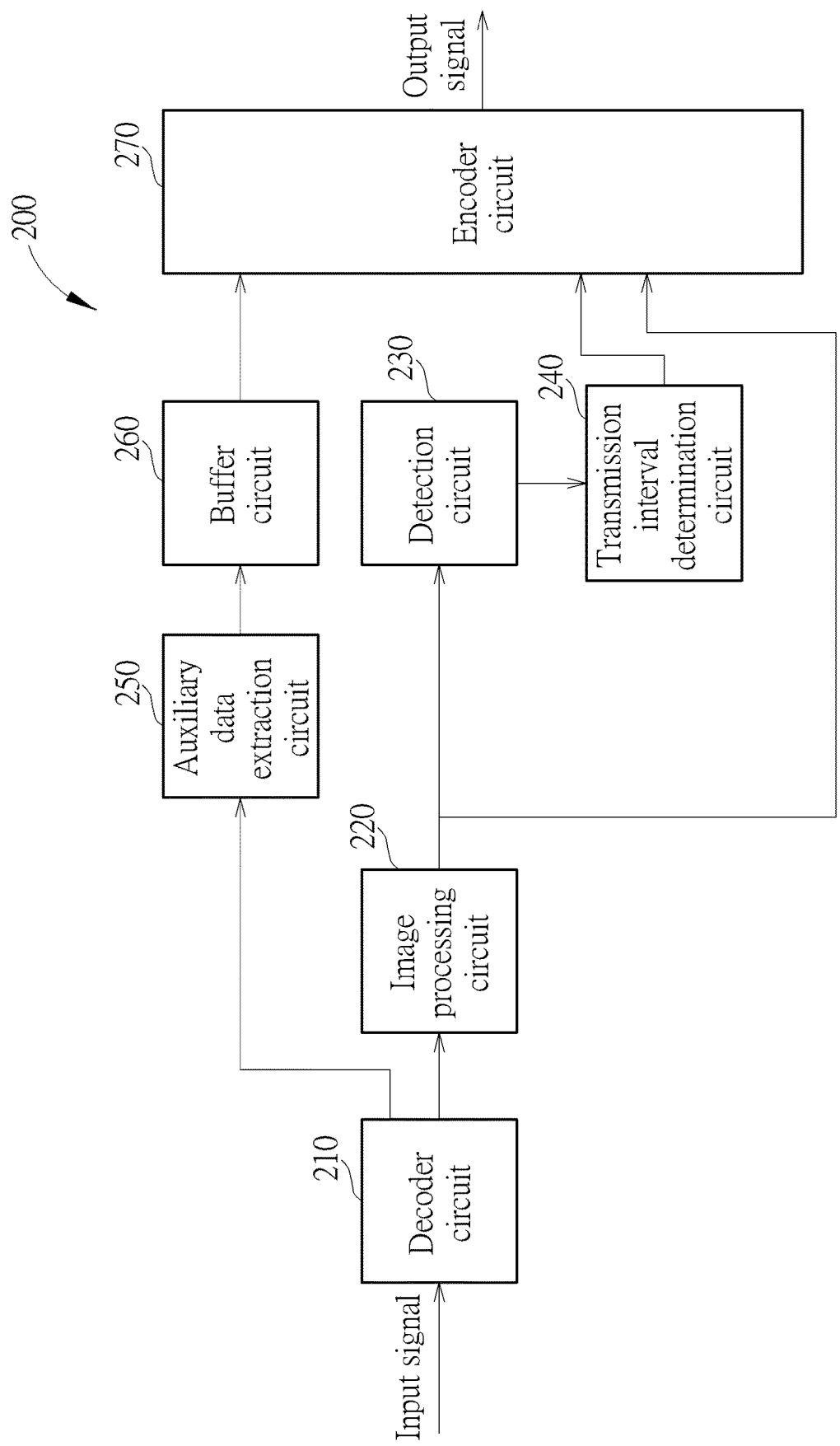
FIG. 2 is a diagram illustrating an electronic device according to an embodiment of the present invention.

FIG. 2 is a diagram illustrating an electronic device 200 according to an embodiment of the present invention. As shown in FIG. 2, the electronic device 200 includes a decoder circuit 210, an image processing circuit 220, a detection circuit 230, a transmission interval determination circuit 240, an auxiliary data extraction circuit 250, a buffer circuit 260, and an encoder circuit 270. In this embodiment, the electronic device is an HDMI repeater, wherein the electronic device 200 receives an HDMI input signal from an external device, processes the HDMI input signal to generate an HDMI output signal, and transmits the HDMI output signal to another electronic device (e.g. a display device for image playback) through an HDMI transmission cable.

Figure 1:
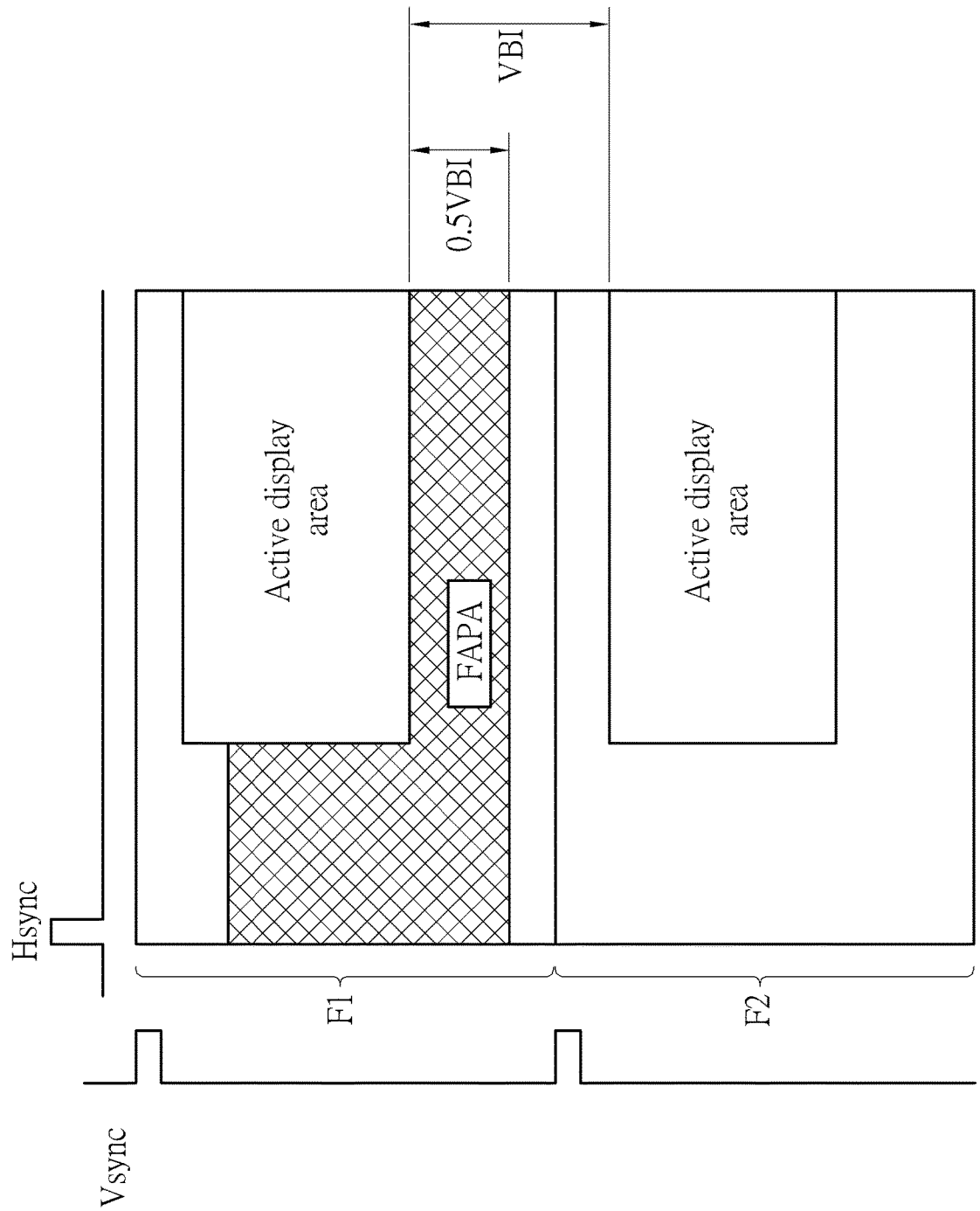
FIG. 1 is a diagram illustrating a frame and a corresponding frame accurate packet area.

In operations of the electronic device 200, the decoder circuit 210 may receive an HDMI input signal, and decode and de-serialize the HDMI input signal to generate a decoded signal, wherein the decoded signal may include the frame content shown in FIG. 1 (i.e. the vertical synchronization signal Vsync, the horizontal synchronization signal Hsync, the image data of the active display area, the auxiliary data located in the FAPA, and other frame information). In this embodiment, the HDMI input signal may support the variable frame rate or the variable refresh rate, and therefore a width (e.g. the number of rows) of the VBI of each frame in the decoded signal may be different. The image processing circuit 220 may perform image processing upon the decoded signal to generate a processed image data, wherein the image processing circuit 220 may perform an image enlargement operation upon the decoded signal (e.g. increase the resolution of the original image), perform an image reduction operation upon the decoded signal (e.g. reduce the resolution of the original image), or directly use the decoded signal as the processed image data.

Figure 3:
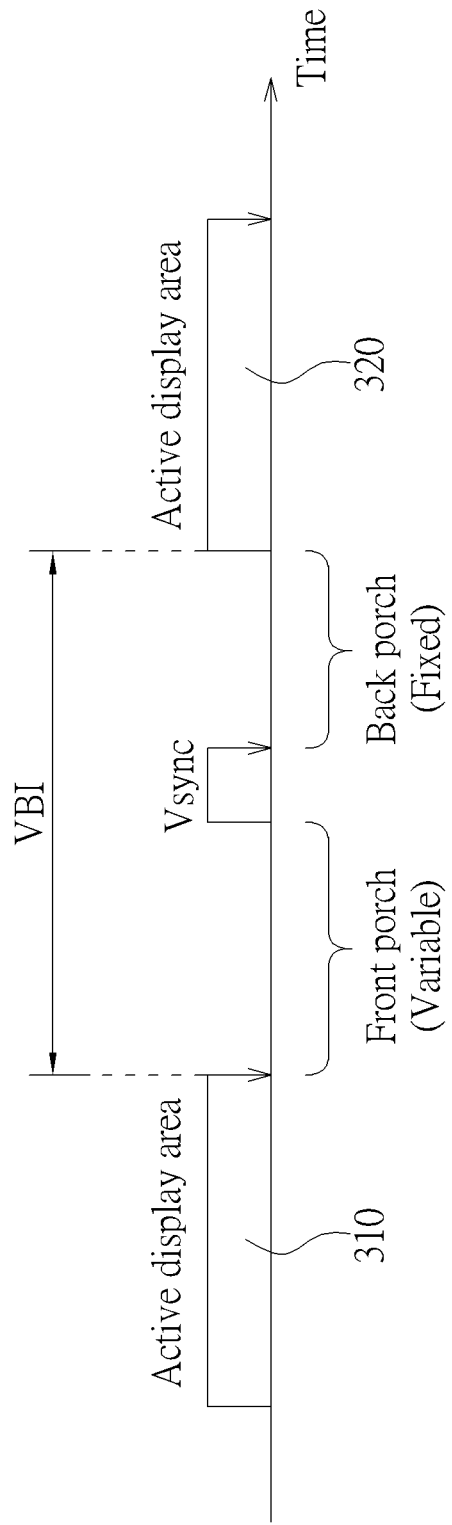
FIG. 3 is a timing diagram of a vertical synchronization signal and an active display area in processed image data.

The detection circuit 230 may detect the processed image data to obtain timing information of the vertical synchronization signal Vsync and the active display area. FIG. 3 is a timing diagram of the vertical synchronization signal Vsync and the active display area in the processed image data, wherein an area between an active display area 310 of a first frame and a subsequent vertical synchronization signal Vsync is a front porch, an area between the vertical synchronization signal Vsync and an active display area 320 of a second frame coming after the first frame is a back porch, and the detection circuit 230 may detect an end time of the active display area 310 and a time corresponding to the vertical synchronization signal Vsync to generate a detection result. In an embodiment, the detection circuit 230 may detect a falling edge of signals of the active display area 310 and a rising edge of the vertical synchronization signal Vsync to generate a detection result, wherein the detection result indicates timing information of the falling edge of the active display area 310 and the rising edge of the vertical synchronization signal Vsync. For example, the detection result may indicate a width between the falling edge of the active display area 310 and the rising edge of the vertical synchronization signal Vsync (e.g. the number of rows of the front porch). In another embodiment, the detection circuit 230 may detect a falling edge of signals of the active display area 310 and a falling edge of the vertical synchronization signal Vsync to generate a detection result, wherein the detection result may indicate timing information of the falling edge of the active display area 310 and the falling edge of the vertical synchronization signal Vsync. For example, the detection result may indicate a width between the falling edge of the active display area 310 and the falling edge of the vertical synchronization signal Vsync. In another embodiment, the width of the vertical synchronization signal Vsync is fixed.

The transmission interval determination circuit 240 may generate a transmission interval according to the detection result generated by the detection circuit 230, wherein the transmission interval is an interval where the auxiliary data located in the FAPA of the HDMI input signal can be transmitted, i.e. the transmission interval generated by the transmission interval determination circuit 240 can be the FAPA in the HDMI specification. In an embodiment, under the design of the variable frame rate or the variable refresh rate, only the front porch will vary with different frame rates, and the back porch will have a fixed width for each frame. As a result, the width of the VBI can be accurately obtained through the detection result generated by the detection circuit 230; more particularly, the width of the VBI can be obtained by adding the width between the falling edge of the active display area 310 and the falling edge of the vertical synchronization signal Vsync to the fixed width of the back porch. Afterwards, the transmission interval determination circuit 240 may determine the transmission interval according to the width of the VBI. Take the FAPA in the HDMI specification as an example. Since a range of the FAPA is half of an area from the horizontal blanking interval to the VBI of the first row of an active display area of a frame, the transmission interval determination circuit 240 may determine half of the VBI coming after the active display area as the transmission interval. For example, assuming that the determined width of the VBI is 180 rows, the transmission interval can be 90 rows after the end of the active display area.

It should be noted that the above-mentioned calculation of the transmission interval is for illustration only, and the present invention is not limited thereto. In other embodiments, as long as the width of the transmission interval needs to change with the width of the VBI, the transmission interval determination circuit 240 can determine an appropriate transmission interval, and is not limited to half of the VBI described by the FAPA in the HDMI specification.

The auxiliary data extraction circuit 250 may extract at least one auxiliary data located in the FAPA from the decoded signal output by the decoder circuit 210, wherein the at least one auxiliary data may include high dynamic range (HDR) metadata, compressed video transport extended metadata (CVTEM), and/or other auxiliary data related to video or audio, and the at least one auxiliary data is stored in the buffer circuit 260.

After the transmission interval determination circuit 240 determines the transmission interval, the encoder circuit 270 may obtain the transmission interval that can be used to transmit the auxiliary data in the processed image data generated by the image processing circuit 220. As a result, the encoder circuit 270 may place the auxiliary data stored in the buffer circuit 260 in the transmission interval of the processed image data, and perform an encoding operation and a serialization operation to generate the HDMI output signal to a back-end electronic device.

In the above embodiments, since the electronic device 200 utilizes the detection circuit 230 to detect the timing of the active display area and the vertical synchronization signal for determining the transmission interval that can be used to transmit the auxiliary data through the transmission interval determination circuit 240, the HDMI output signal can be generated fast and efficiently, and the prior art problem of needing to perform a dynamic setting operation through software can be solved.

It should be noted that, in the above embodiments, the electronic device 200 acts as an HDMI repeater, but the present invention is not limited thereto. In other embodiments, the electronic device 200 can be applicable to other specifications, and more specifically the decoder circuit 210 and the encoder circuit 270 in FIG. 2 can be a decoder circuit and an encoder circuit that conform to other specifications, respectively.

Figure 4:
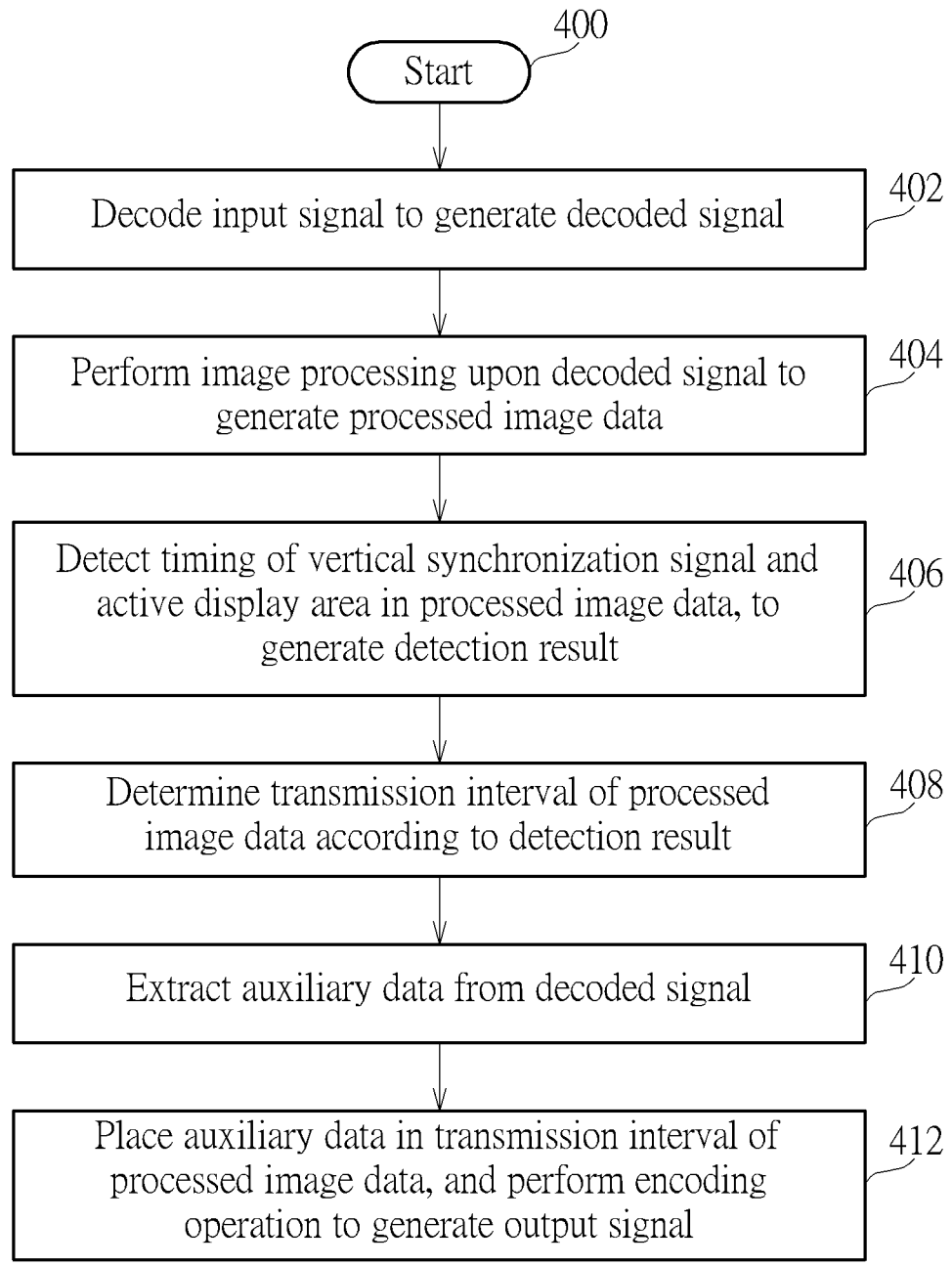
FIG. 4 is a flow chart of a signal processing method according to an embodiment of the present invention.

FIG. 4 is a flow chart of a signal processing method according to an embodiment of the present invention.

In Step 400, the flow starts.

In Step 402, an input signal is decoded to generate a decoded signal.

In Step 404, image processing is performed upon the decoded signal to generate a processed image data.

In Step 406, timing of a vertical synchronization signal and an active display area in the processed image data is detected to generate a detection result.

In Step 408, a transmission interval of the processed image data is determined according to the detection result.

In Step 410, auxiliary data is extracted from the decoded signal.

In Step 412, the auxiliary data is placed in the transmission interval of the processed image data, and an encoding operation is performed to generate an output signal.

Note that, the steps in the method shown above are not recited in the sequence in which the operations are performed. That is, unless the sequence of the operations is expressly indicated, the sequence of the steps is interchangeable, and all or part of the steps may be simultaneously, partially simultaneously, or sequentially performed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
a decoder circuit, arranged to decode an input signal to generate a decoded signal;
an image processing circuit, arranged to perform image processing upon the decoded signal to generate a processed image data;
a detection circuit, arranged to detect a timing of an active display area and a vertical synchronization signal in the processed image data, to generate a detection result;
a transmission interval determination circuit, coupled to the detection circuit, and arranged to determine a transmission interval of the processed image data according to the detection result;
an auxiliary data extraction circuit, arranged to extract an auxiliary data from the decoded signal; and
an encoder circuit, arranged to place the auxiliary data in the transmission interval of the processed image data, and perform encoding to generate an output signal;
wherein the transmission interval determination circuit calculates a width of a vertical blanking interval of the processed image data according to the detection result, for determining the transmission interval of the processed image data.

2. The electronic device of claim 1, wherein the detection circuit detects a timing of a rising edge of the vertical synchronization signal and a falling edge of the active display area in the processed image data, to generate the detection result.

3. The electronic device of claim 1, wherein the detection circuits detects a timing of a falling edge of the vertical synchronization signal and a falling edge of the active display area in the processed image data, to generate the detection result.

4. The electronic device of claim 1, wherein the detection circuit detects a timing of a falling edge of the vertical synchronization signal and a falling edge of the active display area in the processed image data, to generate the detection result; the transmission interval determination circuit obtains a width of a front porch of the processed image data according to the detection result to calculate the width of the vertical blanking interval of the processed image data, for determining the transmission interval of the processed image data.

5. The electronic device of claim 1, wherein the transmission interval is a portion of the vertical blanking interval coming after the active display area in the processed image data.

6. The electronic device of claim 5, wherein the transmission interval is half of the vertical blanking interval coming after the active display area in the processed image data.

7. The electronic device of claim 1, wherein the auxiliary data comprises a high dynamic range metadata or a compressed video transport extended metadata.

8. The electronic device of claim 1, wherein the electronic device supports a High Definition Multimedia Interface (HDMI) specification, the decoder circuit is an HDMI decoder, and the encoder circuit is an HDMI encoder.

9. A signal processing method, comprising:
decoding an input signal to generate a decoded signal;
performing image processing upon the decoded signal to generate a processed image data;
detecting a timing of an active display area and a vertical synchronization signal in the processed image data to generate a detection result;
determining a transmission interval of the processed image data according to the detection result;
extracting an auxiliary data from the decoded signal; and
placing the auxiliary data in the transmission interval of the processed image data, and performing encoding to generate an output signal;
wherein the step of determining the transmission interval of the processed image data according to the detection result comprises:
calculating a width of a vertical blanking interval of the processed image data according to the detection result for determining the transmission interval of the processed image data.

10. The signal processing method of claim 9, wherein the step of detecting the timing of the vertical synchronization signal and the active display area in the processed image data to generate the detection result comprises:
detecting a timing of a rising edge of the vertical synchronization signal and a falling edge of the active display area in the processed image data, to generate the detection result.

11. The signal processing method of claim 9, wherein the step of detecting the timing of the vertical synchronization signal and the active display area in the processed image data to generate the detection result comprises:
detecting a timing of a falling edge of the vertical synchronization signal and a falling edge of the active display area in the processed image data, to generate the detection result.

12. The signal processing method of claim 9, wherein the step of detecting the timing of the vertical synchronization signal and the active display area in the processed image data to generate the detection result comprises:
detecting a timing of a rising edge of the vertical synchronization signal and a falling edge of the active display area in the processed image data, to generate the detection result; and
the step of calculating the width of the vertical blanking interval of the processed image data according to the detection result for determining the transmission interval of the processed image data comprises:
obtaining a width of a front porch of the processed image data according to the detection result to calculate the width of the vertical blanking interval of the processed image data, for determining the transmission interval of the processed image data.

13. The signal processing method of claim 9, wherein the transmission interval is a portion of the vertical blanking interval coming after the active display area in the processed image data.

14. The signal processing method of claim 13, wherein the transmission interval is half of the vertical blanking interval coming after the active display area in the processed image data.

15. The signal processing method of claim 9, wherein the auxiliary data comprises a high dynamic range metadata or a compressed video transport extended metadata.

16. The signal processing method of claim 9, wherein the input signal is a High Definition Multimedia Interface (HDMI) input signal, and the output signal is an HDMI output signal.

* * * * *